(12) United States Patent
Yoshida et al.

(10) Patent No.: US 6,332,647 B1
(45) Date of Patent: Dec. 25, 2001

(54) SEAT FOR VEHICLE

(75) Inventors: Tomonori Yoshida; Noriyuki Ikeda, both of Kanagawa (JP)

(73) Assignee: Ikeda Bussan Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/594,800

(22) Filed: Jun. 16, 2000

Related U.S. Application Data

(62) Division of application No. 09/128,464, filed on Aug. 4, 1998, now Pat. No. 6,076,890.

(30) Foreign Application Priority Data

Aug. 19, 1997 (JP) .................................................... 9-227529
Aug. 19, 1997 (JP) .................................................... 9-249490

(51) Int. Cl.[7] .................................................... B60N 2/30
(52) U.S. Cl. ................ 297/238; 297/378.12; 297/411.32
(58) Field of Search ............................. 297/238, 216.11, 297/366–369, 378.12, 411.32, 411.38

(56) References Cited

U.S. PATENT DOCUMENTS

| | | | |
|---|---|---|---|
| 5,052,748 | * | 10/1991 | Fourrey et al. .................. 297/378.28 |
| 5,393,116 | * | 2/1995 | Bolsworth ........................ 297/378.28 |
| 5,425,568 | * | 6/1995 | Sliney et al. ..................... 297/378.12 |
| 5,522,643 | * | 6/1996 | Matsuura ........................ 297/378.131 |
| 5,558,403 | * | 9/1996 | Hammoud et al. .................. 297/367 |
| 5,603,550 | * | 2/1997 | Holdampf et al. ..................... 297/278 |

* cited by examiner

Primary Examiner—Peter R. Brown
(74) Attorney, Agent, or Firm—Nath & Associates PLLC; Gary M. Nath; Marvin C. Berkowitz

(57) ABSTRACT

A seat for vehicle includes a base member secured to a seat cushion; a rotating arm rotatably supported by the base member through a reclining mechanism; a seat back tiltable with respect to the seat cushion; a center-folding mechanism rotatably supported on the rotating side of the rotating arm; and an arm plate secured to each frame on both sides of the seat back. A second interlocking cam is capable of advancing or retreating into the base member side by a first interlocking cam secured to the arm plate. The base member is provided with a cut-away portion at a predetermined point for containing an engaging portion provided on the tip of the second interlocking cam and for enabling the first and second interlocking cams to act in cooperation, only when the rotating arm is positioned at a predetermined tilt angle.

3 Claims, 11 Drawing Sheets

SEAT FOR VEHICLE

This application is a divisional application of U.S. patent application Ser. No. 09/128,464, filed Aug. 4, 1998, now U.S. Pat. No. 6,076,890 the entirecontents of which are hereby incorporated in their entirety.

BACKGROUND OF THE INVENTION

1. Field of the Invention

The present invention relates to a seat for vehicle in which a seat back can be folded onto a seat cushion, and more particularly to a center-folding seat for vehicle in which the seat back can be tilted with respect to the seat cushion by means of a reclining mechanism comprising a base member secured to the seat cushion, and a rotating arm rotatably supported by the base member, and in which the seat back can be folded onto the seat cushion by means of a center-folding mechanism which comprises an arm plate, rotatably supported on the rotating end side of the above rotating arm and attached to each frame of both sides of the seat back.

Furthermore, the present invention relates to a seat for vehicle, in which a seat back including a child seat or an arm rest or the like therein can be tilted to a seat cushion, and more particularly to a seat for vehicle in which the seat back is attached to the seat cushion so as to be capable of being tilted by means of a reclining mechanism comprising a base member secured to the seat cushion, and a rotating arm rotatably supported by the base member, and in which the rotating arm is rotatably provided with a bracket to be connected to the child seat or the arm rest so that the child seat or the arm rest arm rest can be mounted within the seat back.

2. Description of the Related Art

FIG. 1 and FIG. 2 show a conventional center-folding seat for vehicle of this type which has been proposed. As shown in FIG. 1, according to this conventional seat, a center-folding seat 301 comprises a seat back 303 attached to a seat cushion 302, provided on the floor surface of the vehicle. A reclining mechanism 304, generally comprising a rotating arm 304b rotatably supported by a base member 304a, which is provided on the seat cushion 302 side, enables the seat back 303 to be reclined.

The center-folding seat 301 further comprises an arm plate 305 which is rotatably provided on the rotating end side of the rotating arm 304b. The seat back 303 is secured to this arm plate 305.

Therefore, the seat back 303 can be adjusted to a predetermined reclining angle by operating an operation lever 304c so as to cancel the lock between the base member 304a and the rotating arm 304b, whereby a built-in spring (not shown in the diagram) turns the rotating arm 304b in a counter-clockwise direction, as shown in FIG. 1. This causes the seat back 303 to collapse forward, however when the operation lever 304c is released at the predetermined reclining angle, the seat back 303 becomes fixed in that position.

Next, as shown in FIG. 2, in order to fold over (hereinafter "center-fold") the seat back 303, so as to enable the back face 303a of the seat back 303 to be used as a table, or alternatively, to enable more space to be freed within the vehicle in order to store luggage, the lock between the arm plate 305 and the rotating arm 304b is cancelled so that the arm plate 305 is rotated in a counter-clockwise direction with a rotate support point 305a as the base as shown in FIG. 1. Consequently, the seat back 303 is also folded over to the seat cushion 302 side, thereby becoming center-folded. The back face 303a of the seat back 303 can now be used as a table, or the space behind the center-folding seat 301 can be effectively used to store luggage.

However, when the seat back 303 of the conventional center-folding seat 301 is folded forward to the center-folded state and used as a table or for placing luggage thereabove, since the arm plate 305 is rotatably supported by the rotating arm 304b, the rotating arm 304b tilts at the rear (for instance, in a case when the seat back 303 has been center-folded to a deeply collapsed state), though it is desirable that the back face 303a of the seat back 303 maintains a horizontal position. Therefore, when the seat back 303 is center-folded, the back face 303a of the seat back 303 tilts at the rear end instead of keeping a horizontal position. This results in a disadvantage of inconvenience when the center-folded seat back 303 is to be used as a table or for placing luggage thereon.

Furthermore, when the seat back 303 is center-folded as shown in FIG. 2, the seat back 303 is supported only by the strength of the reclining mechanism 304. Therefore, there is a problem that, when a large load is applied on the center-folded seat back 303, shaking and the like are caused, leading to poor stability and inconvenience.

On the other hand, FIG. 3 shows a seat for vehicle comprising a reclining mechanism, a center-folding mechanism and a child seat, which is contained within the seat back. In the diagram, a center-folding seat 501 for vehicle comprises a seat back 503, capable of being tilted onto a seat cushion 502 by means of a reclining mechanism 504. The reclining mechanism 504 enables the seat back 503 to be folded over onto the upper face of the seat cushion 502. The seat back 503 contains a child seat 506 which is set in place by being collapsed forward.

And, as shown in FIG. 4, the above reclining mechanism 504 comprises a base member 504a, attached to the seat cushion 502, a rotating arm 504b, rotatably supported by the base member 504a, and an arm plate 505, constituting a center-folding mechanism, connected to the rotating arm 504b. In other words, the seat back 503 can be adjusted to a predetermined reclining angle by operating an operation lever 504c so as to cancel the lock between the base member 504a and the rotating arm 504b. Releasing the operation lever 504c, as a result, the basemember 504a and the rotating arm 504b becomes locked in that position, thereby locking the seat back 503 to the seat cushion 502 at the predetermined reclining angle.

Furthermore, when freeing more space or the like inside the vehicle, the seat back 503 can be collapsed Forward around a rotation center 505a of an arm plate 505, secured to both sides of the seat back 503, and stored over the upper face of the seat cushion 502.

However, it is a disadvantage of the conventional center-folding seat 501 that, since the child seat 506 can be pulled in or out irrespective of the reclining angle of the seat back 503, it is even possible to use the child seat 506, for instance, at an inappropriate reclining angle. The unsatisfactory seating position in such a case requires the set position of the child seat 506 to be corrected again, which is not preferable with respect to convenience.

And, as shown in FIG. 5, there is a further disadvantage that the lock of the reclining mechanism 504 may sometimes be inadvertently cancelled while the child seat 506 is being used, leaving room for improvement as regards safety and protection of the child seat 506. FIG. 6 shows a case envisaged in which the center-folding mechanism has been mistakenly activated while the child seat 506 is being used, allowing the seat back 503 to move. Consequently, the conventional center-folding seat 501 has a low level of comfort.

Furthermore, considering a seat type having a movable arm rest provided within the seat back 503 in addition to the child seat 506, it has been pointed about that there is a possibility of the arm rest being used at an unnatural reclining angle. Moreover, when the seat back 503 collapses forward due to the reclining mechanism 504 being unlocked while the arm rest is being used, or when the center-folding mechanism has been mistakenly operated, in a case where the seat back 503 has been folded over and stored, the arm rest will be damaged.

The problems described above also apply to a type of seat for vehicle in which the center-folding mechanism has been removed. In such a case, when the reclining mechanism 504 is unlocked while the child seat 506 is being used, the level of comfort is lowered.

SUMMARY OF THE INVENTION

The present invention has been achieved with such points in mind.

It therefore is an object of the present invention to provide a center-folding seat for vehicle in which the seat back can be tilted with respect to the seat cushion by means of a reclining mechanism, and folded by means of a center-folding mechanism, wherein the back face of the seat back can always be kept horizontal when the seat back is folded to the center-folded state, thereby improving convenience, and shaking can be eliminated when a large load is applied upon the center-folded seat back, thereby achieving strong support.

It is another object of the present invention to provide a seat for vehicle, capable of being reclined by means of a reclining mechanism and folded, if desired, by means of a center-folding mechanism, having a child seat or an arm rest or the like provided within the seat back, wherein the child seat or the arm rest can only be extracted when the seat back is at a predetermined tilt angle, thereby enabling the child seat or the arm rest to be always used in an optimum position, while also providing an interlocking mechanism to prevent the seat back from being released from its reclining lock or being center-folded while the child seat or the arm rest is being used, thereby increasing safety.

To achieve the object, according to a first aspect of the present invention, there is provided a seat for vehicle, comprising: a base member secured to a seat cushion; a rotating arm rotatably supported by the base member through a reclining mechanism; a seat back tiltable with respect to the seat cushion; a center-folding mechanism rotatably supported on the rotating side of the rotating arm; and an arm plate secured to each frame on both sides of the seat back; wherein a first interlocking cam of the center-folding mechanism is secured to the arm plate; a second interlocking cam of the center-folding mechanism is slidably mounted on the rotating arm in such a manner that the second interlocking cam is capable of advancing or retreating into the base member side by the first interlocking cam; and the base member is provided with a cut-away portion at a predetermined point for containing an engaging portion provided on the tip of the second interlocking cam and for enabling the first and second interlocking cams to act in cooperation, only when the rotating arm is positioned at a predetermined tilt angle, thereby activating the interlocking mechanism at only a predetermined tilt angle of the rotating arm so as to lock the arm plate to the base member.

According to the present invention, when the lock between the arm plate secured to the seat back and the rotating arm is cancelled, the arm plate and the seat back reach a state in which they can be rotated around a rotation fulcrum. However, the cooperative action of the first interlocking cam and the second interlocking cam is needed in order to rotate the arm plate. The second interlocking cam on the rotating arm side is directly contacting the rim of the base member, and is able to advance only when an engaging portion, provided on the tip of the second interlocking cam, has latched with the cut-away portion, provided at the predetermined position in the rim of the base member.

Therefore, in order to center-fold the seat back, it is first necessary to use the reclining mechanism to tilt the rotating arm to a predetermined angle with respect to the seat cushion, positioning the seat back in a position where the cut-away portion, provided at a predetermined position on the base member, latches with the engaging portion on the tip of the second interlocking cam. Then, after the arm plate has been unlocked from the rotating arm, when the arm plate and the seat back secured thereto are rotated forward, the second interlocking cam on the rotating arm acts in cooperation with the first interlocking cam on the arm plate, both advancing forward toward the base member until the engaging portion on the tip of the second interlocking cam clips inside the cut-away portion on the base member. As a result, the first and second interlocking cams act in cooperation, enabling the arm plate and the seat back to be center-folded.

In this way, rather than allowing center-folding irrespective of the tilt angle of the rotating arm and the seat back, the rotation of the arm plate (in other words, the center-folding operation of the seat back) is permitted only when the rotating arm is at a predetermined tilt angle. Thus, the tilt angle of the rotating arm with respect to the base member when the seat back is able to be center-folded is always fixed.

Therefore, by pre-setting the rotating arm at a predetermined tilt angle, at which the back face of the seat back is horizontal during the center-folded state, and setting the cut-away portion at an appropriate position, it is possible to ensure that the back face of the seat back is always horizontal in the center-folded state.

In this connection, a horizontally stabilized table is available according to the invention, so that the seat back is convenient to use as a table since the objects located thereon do not fall down.

Furthermore, when the seat back is center-folded, the arm plate secured to the seat back is supported by the rotating end of the rotating arm, and the second interlocking cam on the rotating arm engages with the cut-away portion on the base member. Since the rotating arm is firmly joined to the base member, the rotating arm is firmly supported by the interlocking mechanism with the effect that, even when a large load is applied upon the back face of the center-folded seat back, the center-folded seat back does not shake.

According to a second aspect of the present invention, there is provide a seat for vehicle, comprising: a base member secured to a seat cushion; a rotating arm rotatably supported by the base member through a reclining mechanism; a seat back tiltable with respect to the seat cushion; and a fitting bracket rotatably supported by the rotating arm, the bracket provided with a child seat or an arm rest to be contained within the seat back; wherein the fitting bracket comprises a first interlocking cam; the rotating arm comprises a second interlocking cam which cooperates with the first interlocking cam and is capable of advancing or retreating to the base member side; the base member comprises a cut-away portion at a predetermined point on the base member for containing an engaging portion provided on the tip of the second interlocking cam only when the rotating arm is at a predetermined tilt angle; thereby activating an interlocking mechanism constituted by the first and second interlocking cams which cooperates with the rotation of the fitting bracket so as to lock the rotating arm to the base member so that the fitting bracket is allowed to rotate only at the predetermined tilt angle of the rotating arm.

According to a third aspect of the present invention, there is provide a seat for vehicle, comprising: a base member secured to a seat cushion; a rotating arm rotatably supported by the base member through a reclining mechanism; a seat back tiltable with respect to the seat cushion; a center-folding mechanism rotatably supported on the rotating side of the rotating arm; and an arm plate secured to each frame on both sides of the seat back; a fitting bracket for fitting a child seat or an arm rest rotatably supported by the arm plate, wherein the seat back can be folded onto the seat cushion by the center-folding mechanism; the child seat or the arm rest is contained within the seat back; the fitting bracket comprises a first interlocking cam; the rotating arm comprises a second interlocking cam which cooperates with the first interlocking cam and is capable of advancing or retreating to the base member side; the base member comprises a cut-away portion at a predetermined point on the base member for containing an engaging portion provided on the tip of the second interlocking cam only when the rotating arm is at a predetermined tilt angle; the fitting bracket is allowed to rotate only at the predetermined tilt angle of the rotating arm; thereby activating an interlocking mechanism constituted by the first and second interlocking cams which cooperates with the rotation of the fitting bracket so as to lock the rotating arm to the base member.

Therefore, according to the second and third aspects of the present invention, when using a child seat or an arm rest contained in the seat back, the fitting bracket collapses forward. However, the fitting bracket comprises the first interlocking cam, and the cooperative action of this first interlocking cam with the second interlocking cam on the rotating arm side is required in order to rotate the fitting bracket. Since the second interlocking cam on the rotating arm side is contacting directly with the rim of the base member, the second interlocking cam cannot advance or retreat unless the engaging portion on the tip of the second interlocking cam latches with the cut-away portion provided at the predetermined position in the rim of the base member.

Furthermore, in order to rotate the fitting bracket so as to use the child seat or the arm rest, it is first necessary to use the reclining mechanism to tilt the rotating arm to a predetermined angle with respect to the seat cushion, positioning the rotating arm in a position where the cut-away portion, provided at a predetermined position on the base member, latches with the engaging portion on the tip of the second interlocking cam.

Next, by rotating the fitting bracket forward when the rotating arm is at a predetermined reclining angle, the second interlocking cam advances toward the base member along the face of the first interlocking cam of the fitting bracket, whereby the engaging portion on the tip of the second interlocking cam enters the cut-away portion on the base member. As a result, the first and second interlocking cams, which comprise the interlocking mechanism, act in cooperation so as to collapse the fitting bracket to the front side.

Thus, rather than allowing the child seat or the arm rest to be pulled out irrespective of the tilt angle of the seat back, the fitting bracket can rotate (in other words, the child seat or arm rest can be used) only when the rotating arm is at an appropriate tilt angle. Consequently, it is possible to ensure that the seat back is always at an appropriate angle when using the child seat or the arm rest. Therefore, the level of comfort thereof is improved.

Furthermore, since the engaging portion on the tip of the second interlocking cam of the rotating arm is clipped into the cut-away portion on the base member when the child seat or the arm rest is in use, the reclining action is restricted to the case where the engaging portion on the tip of the second interlocking cam of the rotating arm moves within the cut-away portion. This prevents the seat back from collapsing forward when the reclining mechanism is inadvertently unlocked. Therefore, the usage of the child seat or the arm rest is safely improved, and damage applied to the child seat or the arm rest can be avoided.

Moreover, the fitting strength of the rotating arm and the seat back is improved not only by the lock strength of the reclining mechanism, but also by the interlocking mechanism constituted by the first and second interlocking cams. In this connection, since the base member and rotating arms are locked by the interlocking mechanism when the child seat or the arm rest is used, the seat back is stabilized without trembling is improved with safety even when the seat back receives with over load.

According to a fourth aspect of the present invention, as it depends from the third aspect, wherein the second interlocking cam is provided at a predetermined point with a protrusion cancelling the center-folding operation; the center-folding mechanism is provided with a center-folding latch; and the protrusion is positioned in the motion oath of the center-folding latch when the engaging portion on the tip of the second interlocking cam clips into the cut-away portion at the predetermined point in the base member, thereby locking the interlocking mechanism.

In the seat for vehicle according to the fourth aspect, when the second interlocking cam is acting in cooperation with the first interlocking cam so that the engaging portion of the second interlocking cam is inside the cut-away portion on the base member, this protrusion is positioned above the motion path of the center-folding latch. Consequently, prior to the operation of the interlocking mechanism (namely, when the engaging portion of the second interlocking cam is not inside the cut-away portion), the second interlocking cam retracts to a position which does not obstruct the rotation of the center-folding latch, thereby preventing the seat back from center-folding when the child seat or the arm rest in being used.

Therefore, the seat back cannot be mistakenly center-folded when the child seat or the arm rest is in use.

Furthermore, the protrusion does not obstruct the motion of the center-folding latch and center-folding cam when the fitting bracket provided with the child seat or the arm rest is mounted into the seat back. On the contrary, when the fitting bracket is moved out of the seat back for using the child seat or the arm rest, the protrusion is located on the motion path of the center-folding latch to cancel the operation of the center-folding. Therefore, the seat for vehicle is not center-folded, thereby improving the high level comfort with safety.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
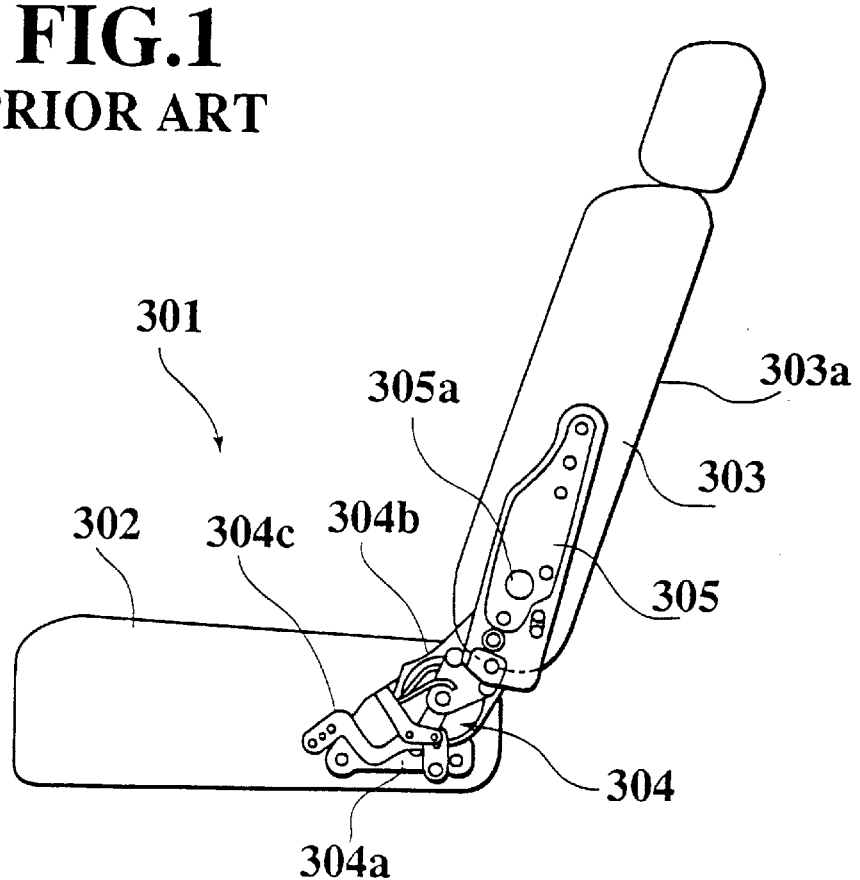
FIG. 1 is a side view of a conventional center-folding seat.
Figure 2:
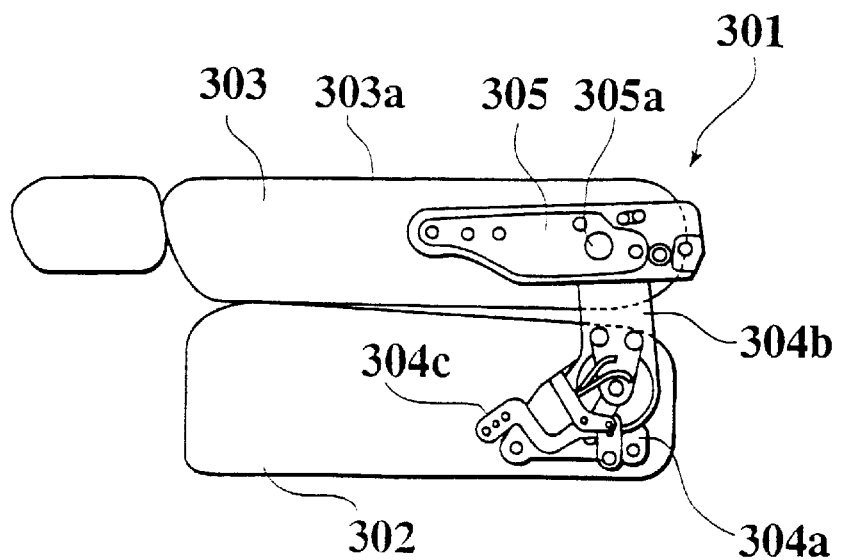
FIG. 2 is a side view of a conventional center-folding seat in a center-folded state.
Figure 3:
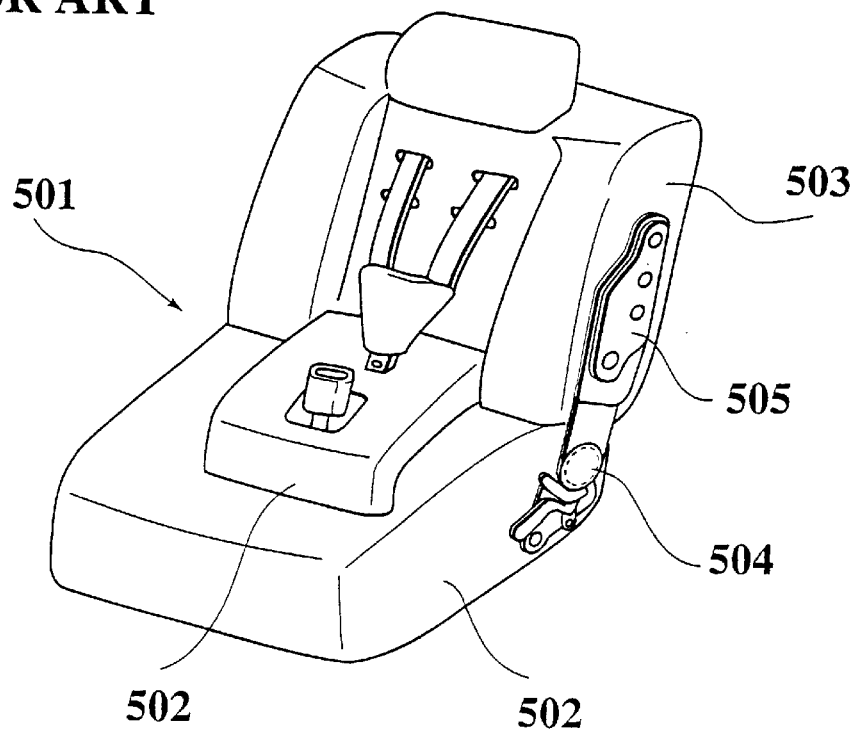
FIG. 3 is an external view of a conventional seat containing a child seat for vehicle.
Figure 4:
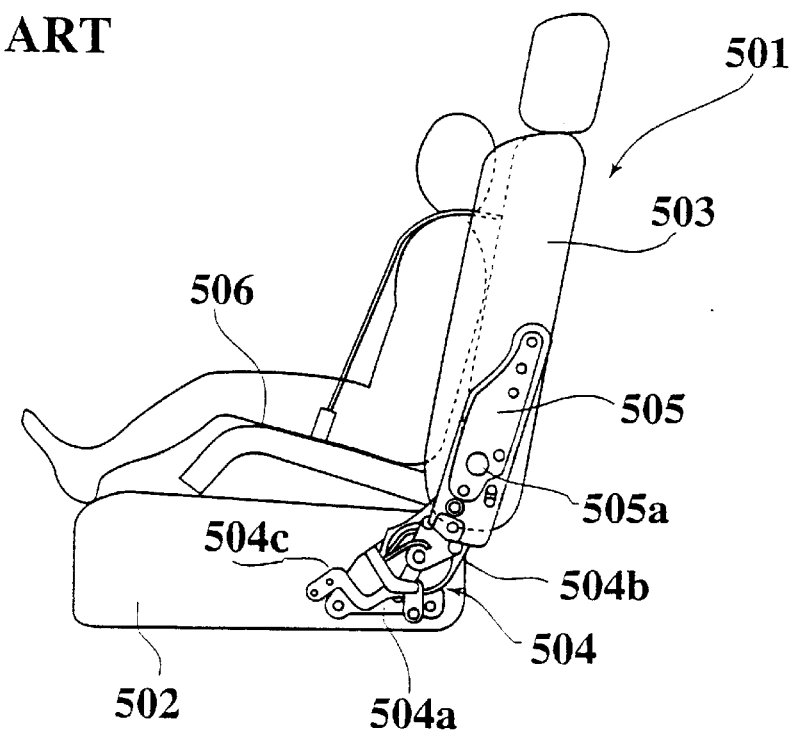
FIG. 4 is a side view of a child seat on a conventional seat for vehicle in the extracted state.
Figure 5:
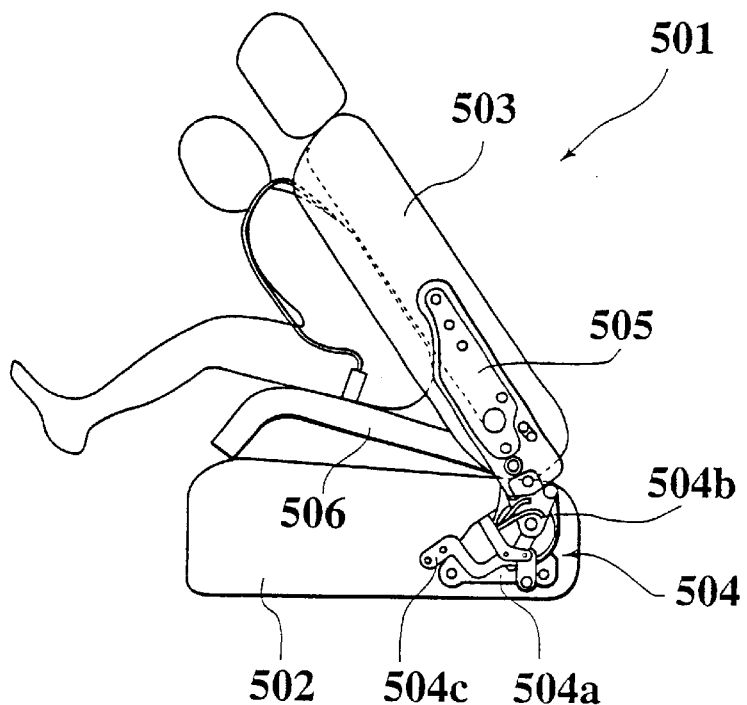
FIG. 5 is a diagram illustrating a reclining unlocked state when using a child seat on a conventional seat for vehicle.
Figure 6:
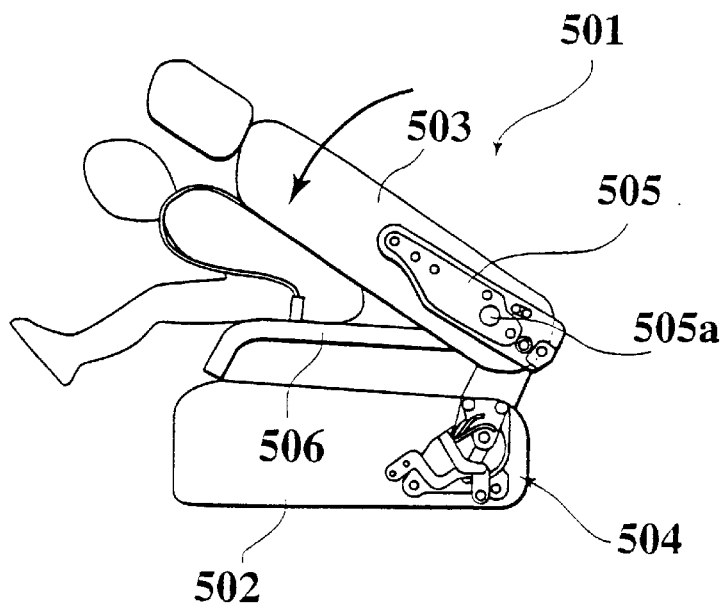
FIG. 6 is a diagram illustrating a seat back center-folded state when using a child seat on a conventional seat for vehicle.

There will be detailed below the preferred embodiments of the present invention with reference to the accompanying drawings. Like members are designated by like reference characters.

Figure 7:
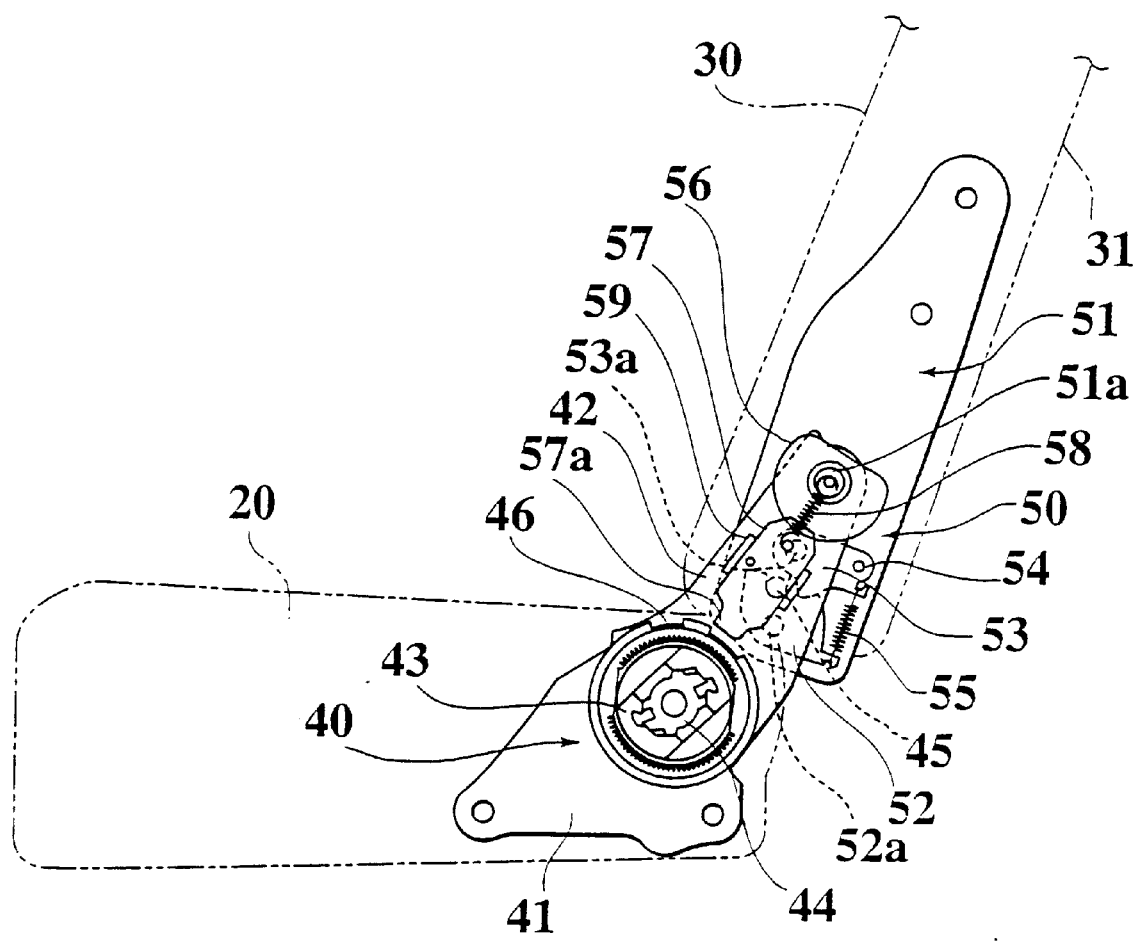
FIG. 7 is a side view of a center-folding seat according to an embodiment of the present invention.
Figure 8:
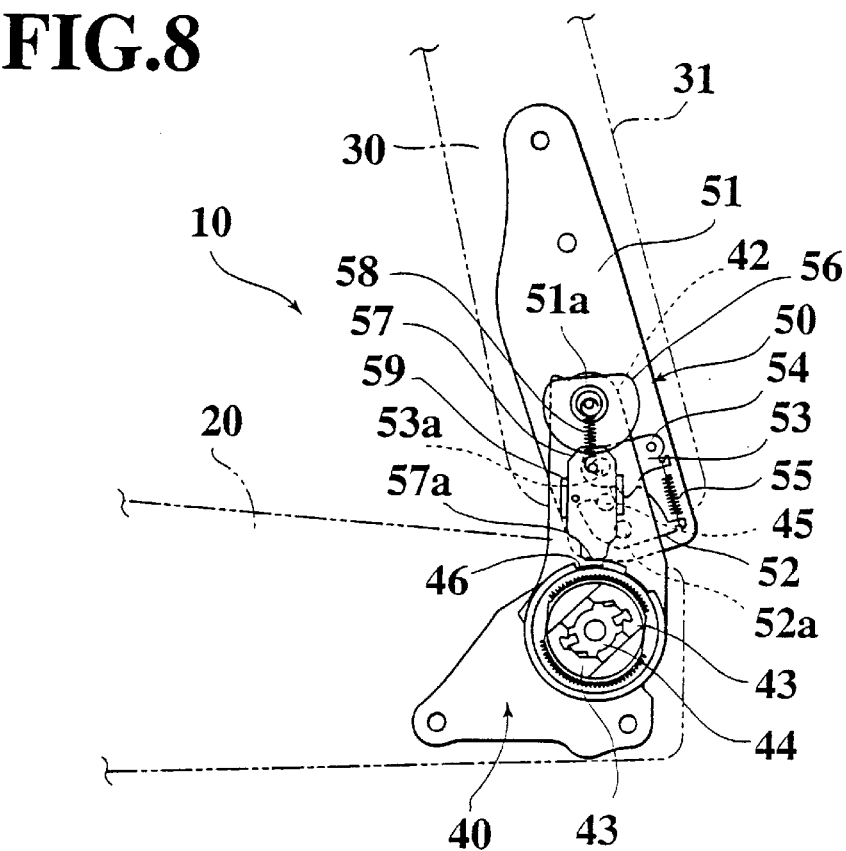
FIG. 8 is a side view of the center-folding seat of FIG. 7 when the seat back has been adjusted to a predetermined reclining angle.
Figure 9:
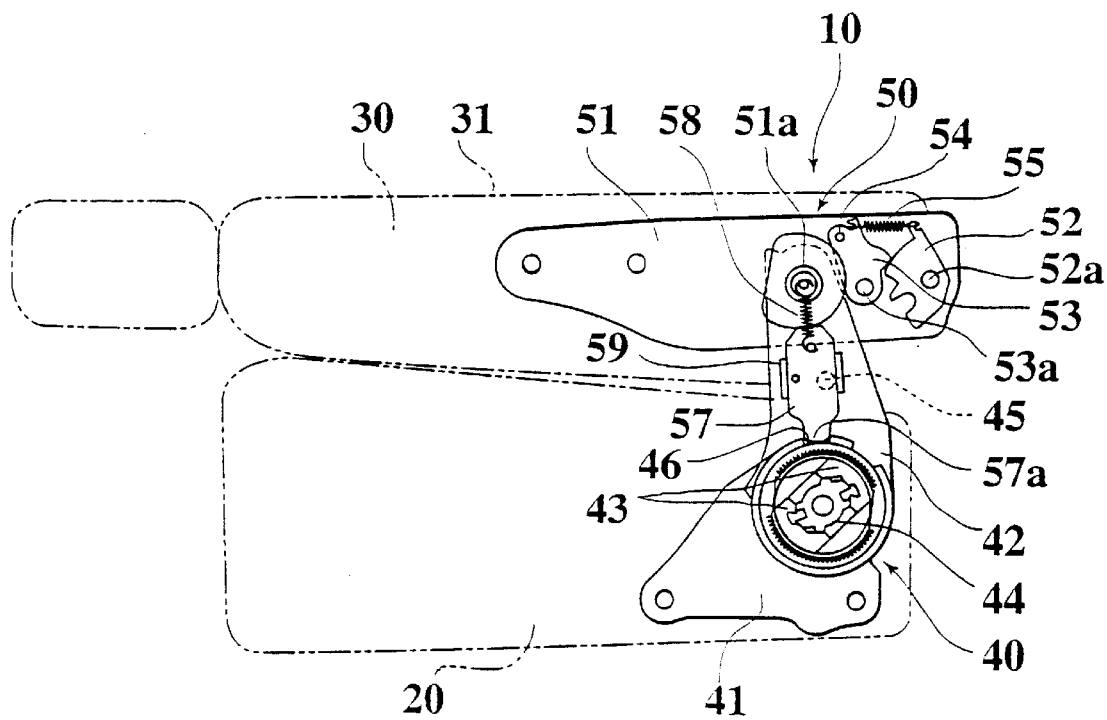
FIG. 9 is a side view of the center-folding seat of FIG. 7 when the seat back has been center-folded.

FIG. 7 is a side view of a configuration of a center-folding seat at right end, FIG. 8, a side view of the same center-folding seat when the seat back has been tilted as far as a state where center-folding is possible, and FIG. 9, a side view of the same center-folding seat when the seat back has been center-folded.

In FIG. 7, the center-folding seat 10 comprises a seat back 30 for supporting the back of a passenger, which is attached via a reclining mechanism 40 and a center-folding mechanism 50 to a seat cushion 20 secured to the floor of the vehicle. The reclining mechanism 40 enables the seat back 30 to be adjusted to a predetermined tilt angle with respect to the seat cushion 20. In addition, the center-folding mechanism 50 enables the seat back 30 to be folded over the upper face of the seat cushion 20 so that the back face 31 of the seat back 30 can be used as a table, or alternatively, luggage space for storing a large load of luggage can be provided.

More specifically, the reclining mechanism 40 is principally comprised of a base member 41, secured to the seat cushion 20, and a rotating arm 42, rotatably supported by the base member 41. An arm plate 51 of the center-folding mechanism 50 is rotatably supported by the rotating end side of the rotating arm 42. This arm plate 51 is secured to both sides of the seat back frame of the seat back 30.

Therefore, the rotating arm 42 can be rotated to a predetermined tilt angle with respect to the base member 41 by operating the reclining mechanism 40. Moreover, it is possible to lock the rotating arm 42 at a predetermined lock position, thereby enabling the seat back 30 to be locked at a predetermined reclining angle with respect to the seat cushion Since the reclining mechanism 40 is not a primary element of the present invention, detailed description will be omitted here. Briefly, a toothed inner 43, provided between the base member 41 and the rotating arm 42, is controlled by a cam 44, rotated by an operation lever not shown in the diagram. In the locked state, a predetermined lock position is maintained by the meshing action of the inner teeth on the rotating arm 42 side with the toothed portion of the toothed inner 43. The reclining lock can be cancelled by rotating the cam 44, thereby cancelling the mesh between the toothed portions of the toothed inner 43 and the rotating arm 42, enabling the seat back 30 to be tilted.

However, it is a characteristic of the present invention that the center-folding mechanism 50, provided to the center-folding seat 10, contains an interlocking mechanism therein. This ensures that when the center-folding seat 10 is center-folded and the back face 31 of the seat back 30 is being used as a table, the table surface is always horizontal. As a result, ease of operability is improved and the support strength of the seat back 30 in the center-folded state is increased, increasing the stability of the seat back 30.

In other words, the center-folding mechanism 50 comprises the arm plate 51, secured on both sides of the seat back frame of the seat back 30 and rotatably supported at the rotation fulcrum 51a on the rotating end side of the rotating arm 42, and a lock mechanism, for locking the arm plate 51 to the rotating arm 42, comprising a striker 45 which is provided to the rotating arm 42. Further, the arm plate 51 has a center-folding latch 52 which latches with the striker 45, the center-folding latch being provided to the arm plate 51 so as to rotate around a rotation fulcrum 52a.

And, a center-folding cam 53, provided in correspondence with the center-folding latch 52, is attached rotatably around a rotation fulcrum 53a. In addition, an operation lever 54 is provided on the opposite side of the rotation fulcrum 53a and a lock spring 55 is provided between the center-folding latch 52 and the center-folding cam 53.

Therefore, the connection between the center-folding latch 52 and the striker 45 can be cancelled by using the operation lever 54 to operate the center-folding latch 52 in cooperation with the center-folding cam 53, thereby cancelling the lock between the rotating arm 42 and the arm plate 51.

Furthermore, an interlocking mechanism of the arm plate 51 comprises an interlocking cam A56 as a first interlocking cam provided around the rotation fulcrum 51a of the arm plate 51. In addition, the rotating arm 42 has an interlocking cam B57 as a second interlocking cam which contacts directly with the interlocking cam A56. The interlocking cam B57 is spring-loaded in the direction contacting directly with the interlocking cam A56, by means of a spring for cancelling 58. And, along the cam face of the interlocking cam A56, the interlocking cam B57 advances and retreats into the base member 41 side. The rotating arm 42 further comprises a guide wall 59 in order to guide the interlocking cam B57.

A cut-away portion 46, provided at a predetermined point in the rim of the base member 41 of the reclining mechanism 40, meshes with an engaging portion 57a on the tip of the above-mentioned interlocking cam B57, thereby locking the interlocking mechanism.

The center-folding seat 10 of the present invention comprises the reclining mechanism 40 and the center-folding mechanism 50 (including the interlocking mechanism) described above. Next, the center-folding operation of the seat back 30 will be explained.

The user performs center-folding when he wishes to fold over the seat back 30 in order to use the back face 31 of the seat back 30 as a table, or alternatively, to create more space for holding large-size luggage. However, from the tilt angle of the seat back 30 shown in FIG. 7, even when the user operates the operation lever 54 of the arm plate 51 to cancel the mesh between the center-folding latch 52 and the striker 45, it is not possible to rotate the arm plate 51 in a counter-clockwise (as shown in the diagram) direction around the rotation fulcrum 51a because the interlocking cam B57 is striking against the base member 41 (specifically, the engaging portion 57a of the interlocking cam B57 is directly contacting with the rim of the base member 41).

Accordingly, as shown in FIG. 8, the user must first operate the reclining mechanism 40 and tilt the rotating arm 42 to a predetermined tilt angle with respect to the base member 41, rotating the rotating arm 42 until the engaging portion 57a of the interlocking cam B57 is opposed to the cut-away portion 46 of the base member 41. As a consequence, the arm plate 51 and the seat back 30 are tilted.

In this state, when the operation lever 54 is lifted upwards in this state, the center-folding cam 53 presses against the center-folding latch 52, detaching the center-folding latch 52 from the striker 45 and consequently cancelling the lock between the arm plate 51 and the rotating arm 42. In this state, when the arm plate 51 is rotated around the rotation fulcrum 51a in a counter-clockwise (as shown in the diagram) direction, the interlocking cam B57 is pressed downward along the cam face of the interlocking cam A56, whereby the engaging portion 57a on the tip of the interlocking cam B57 meshes with the cut-away portion 46 of the base member 41. As a result, the arm plate 51 becomes rotatable. When the arm plate 51 is rotated, the cooperative action of the interlocking cams A56 and B57 enables the seat back 30 to be collapsed to the center-folded state.

According to the present invention, the arm plate 51 and the seat back 30 first become center-foldable only when the rotating arm 42 is positioned at a predetermined tilt angle with respect to the base member 41. In the case of the conventional technique, where center-folding is possible irrespective of the tilt angle of the seat back 30, when the seat back 30 was folded over, the back face 31 of the seat back 30 generally did not always remain horizontal and was often sloping, making it extremely inconvenient for use as a table. By contrast, in the case of the present invention, center-folding is possible only when the rotating arm 42 is at a predetermined tilt angle. Therefore, when the rotating arm 42 is at this predetermined tilt angle, enabling the seat back 30 to be center-folded, the center-folded position of the center-folded seat back 30 is always fixed. As shown in FIG. 9, the back face 31 of the seat back 30 can be restricted to a horizontal position when in the center-folded state by setting the tilt angle of the rotating arm 42 so that the back face 31 of the seat back 30 is supported horizontally. This improves convenience when using the back face 31 of the center-folded seat back 30 as a table, while removing the possibility of luggage falling off and the like when luggage has been placed thereon, thereby achieving excellent storage capability.

Furthermore, as shown in FIG. 9, when the seat back 30 is center-folded, the arm plate 51, which is attached to the seat back 30, is supported by the rotating arm 42 due to the fact that the interlocking cam B57 is clipped into the cut-away portion 46 of the base member 41. Moreover, the supporting strength of the rotating arm 42 is increased, not only by the lock mechanism inside the reclining mechanism 40, however also by the interlocking mechanism. This results in an advantage that the seat back 30 has excellent stability when used as a table, since there is no shaking even when a much greater load is applied.

Next, a second embodiment of the seat for vehicle of the present invention will be explained with reference to the drawings.

Figure 10:
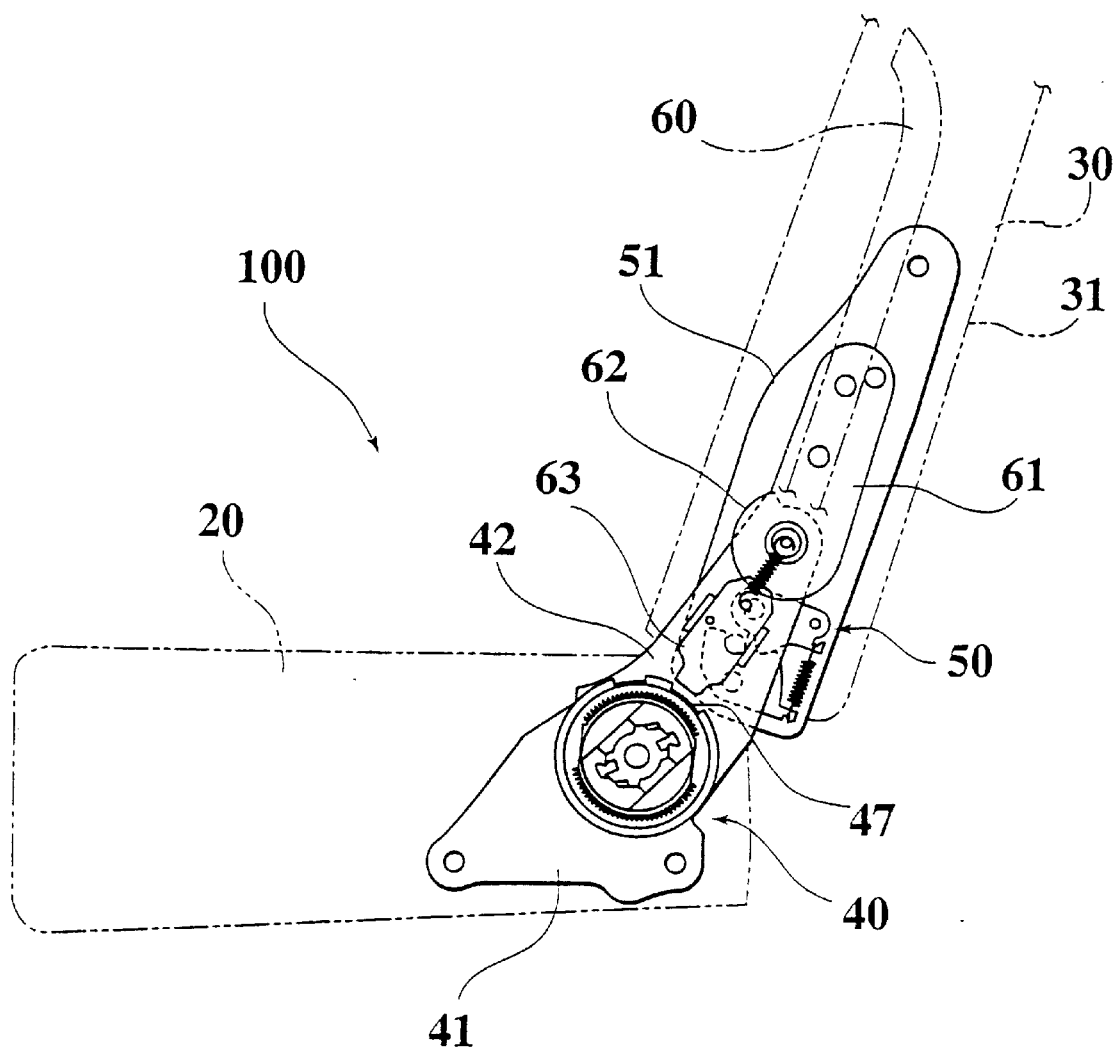
FIG. 10 is a side view of a seat for vehicle according to a second embodiment of the present invention.
Figure 11:
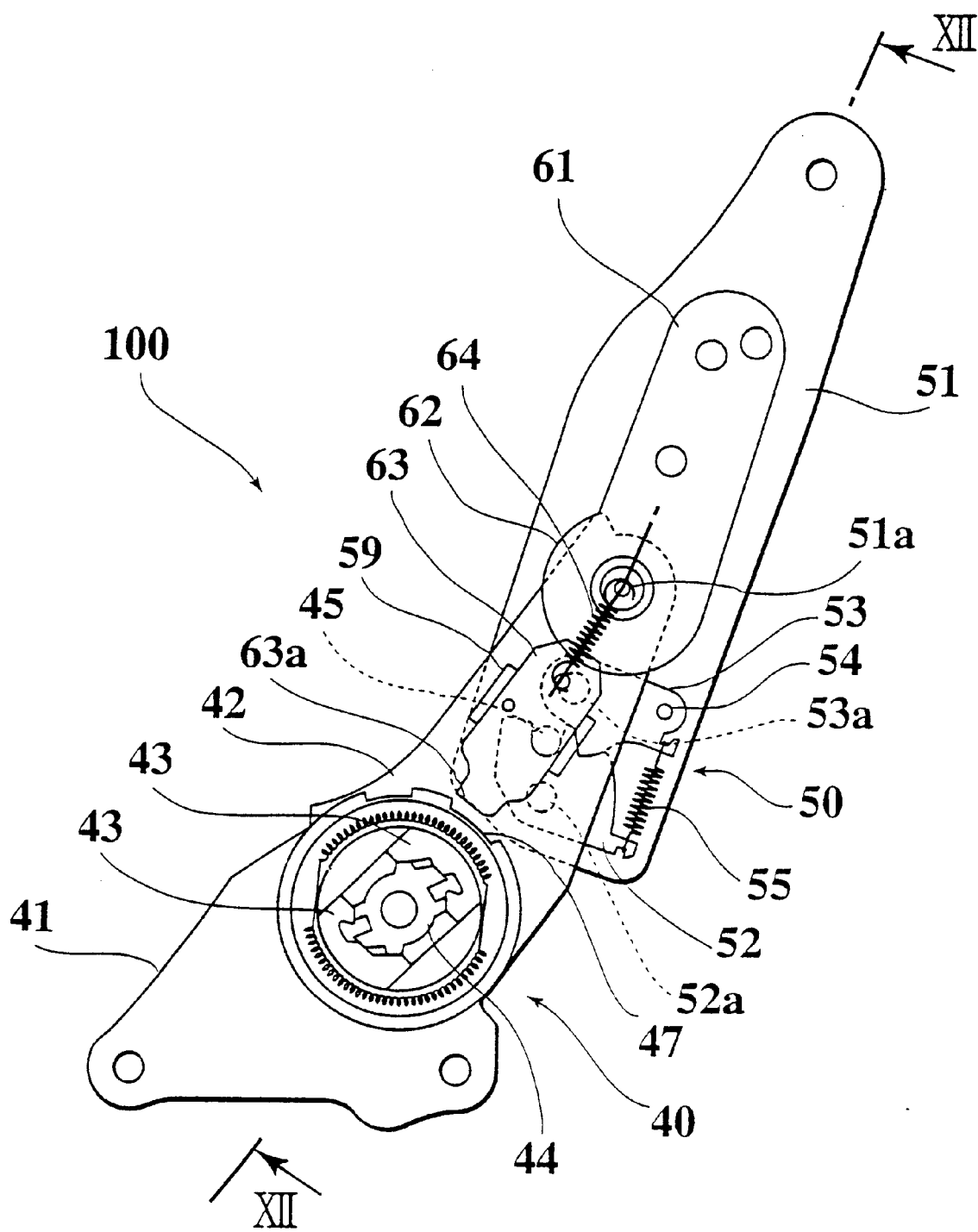
FIG. 11 is a side view of mechanism parts of the seat for vehicle of the present embodiment.
Figure 12:
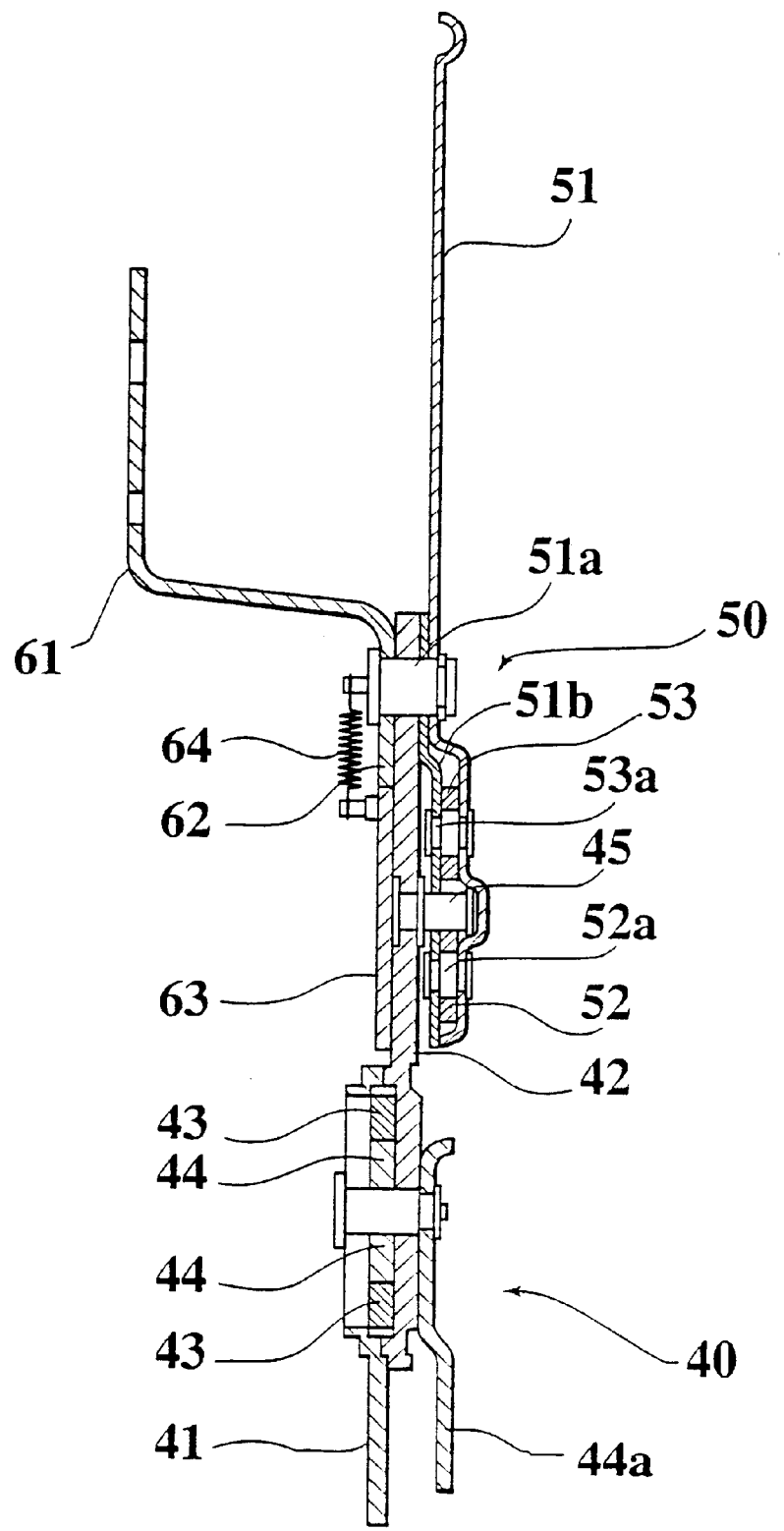
FIG. 12 is a cross-sectional view of the seat for vehicle of the present invention taken along the line XII—XII in FIG. 11.
Figure 13:
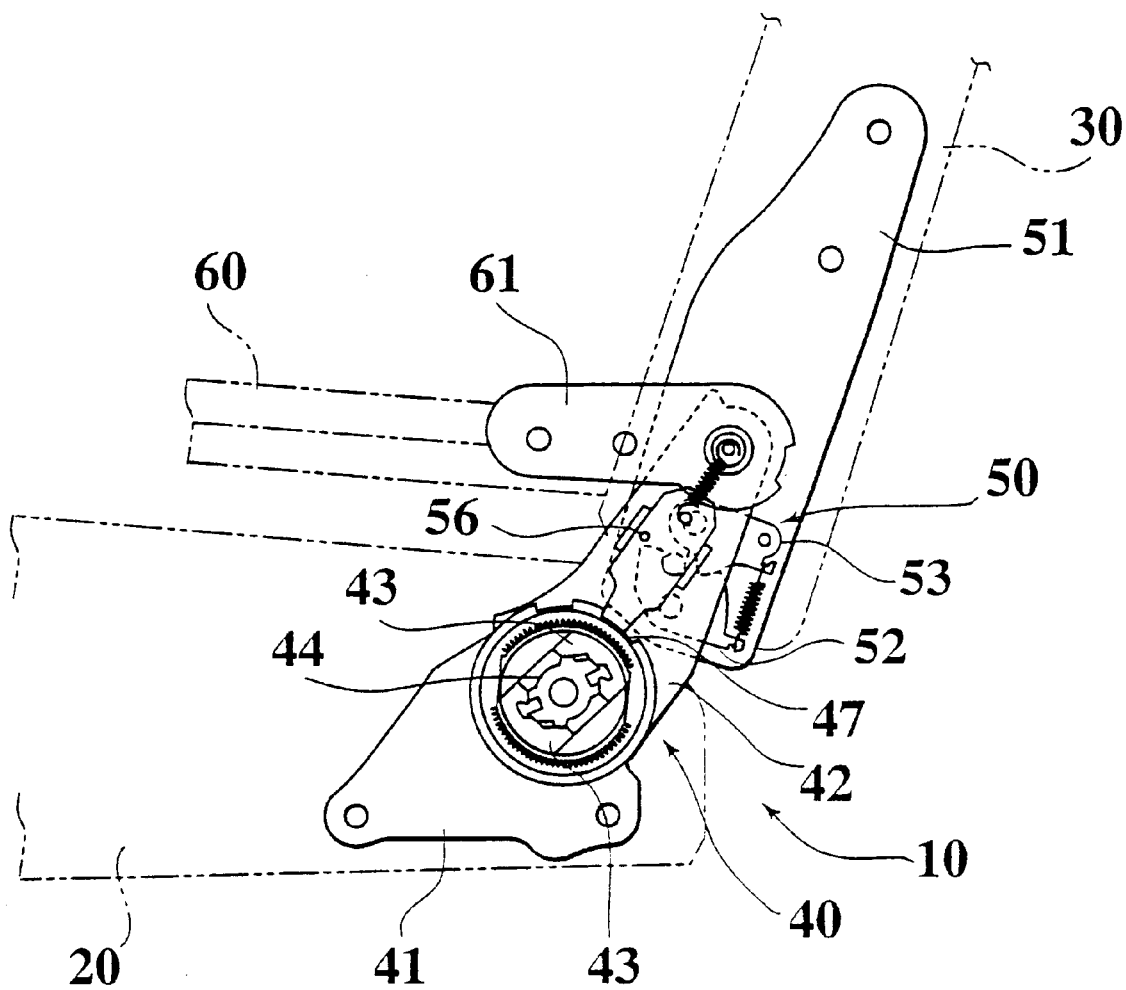
FIG. 13 is a side view of the seat for vehicle of the present invention when a child seat is being used.
Figure 14:
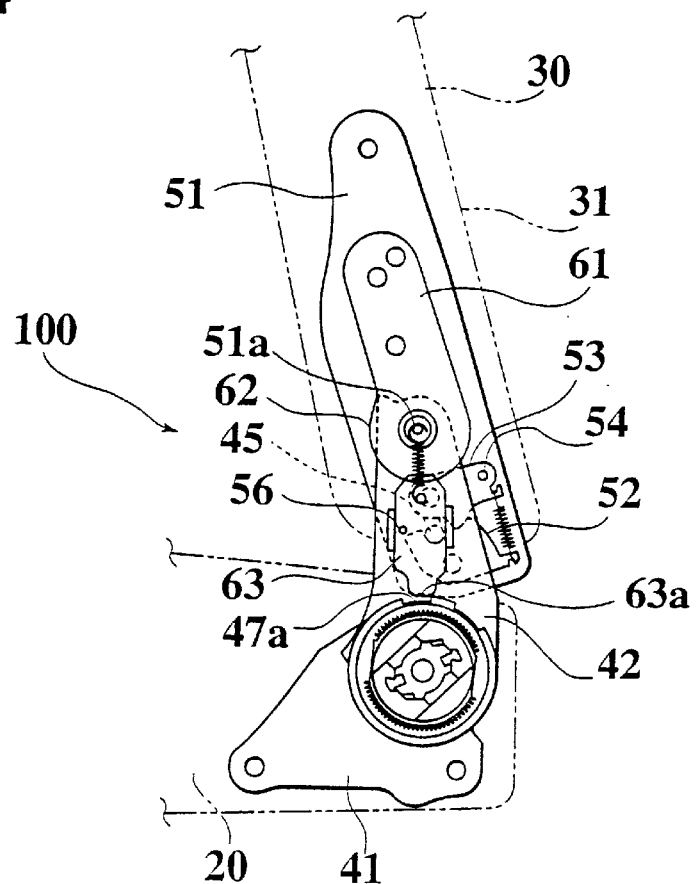
FIG. 14 is a side view of the seat for vehicle of the present invention when the reclining angle of the seat back is adjusted.
Figure 15:
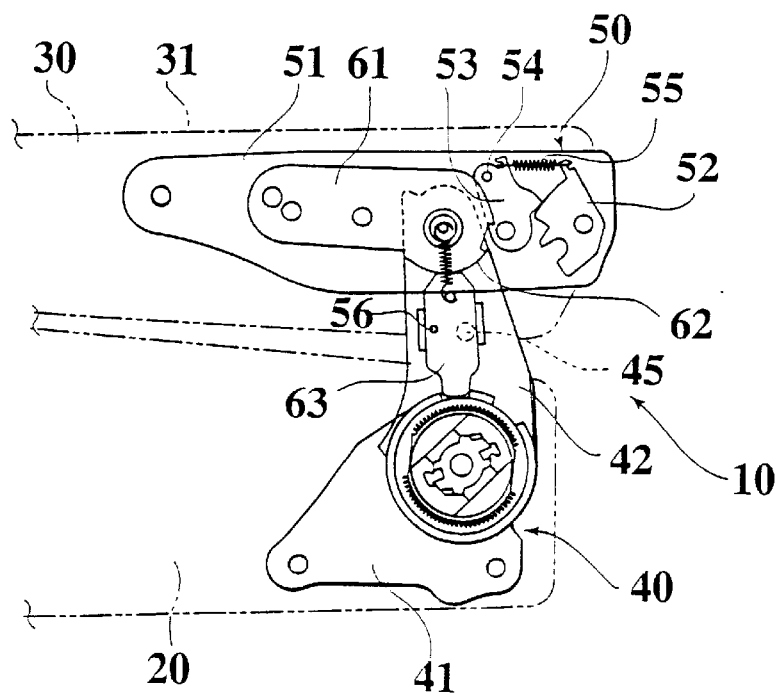
FIG. 15 is a side view of the center-folding operation of the seat for vehicle of the present invention.

FIG. 10 is a side view of the seat for vehicle according to the second embodiment of the present invention. More specifically, FIG. 10 shows the side view of the right side end of the seat for vehicle seen from the middle portion of the seat. FIG. 11 is a side view of mechanism parts of the seat for vehicle, FIG. 12 is a cross-sectional view of the mechanism parts, FIG. 13 is a side view of the seat for vehicle of the present invention when a child seat is being used. FIGS. 14 and 15 are side views of the center-folded state.

Figure 16:
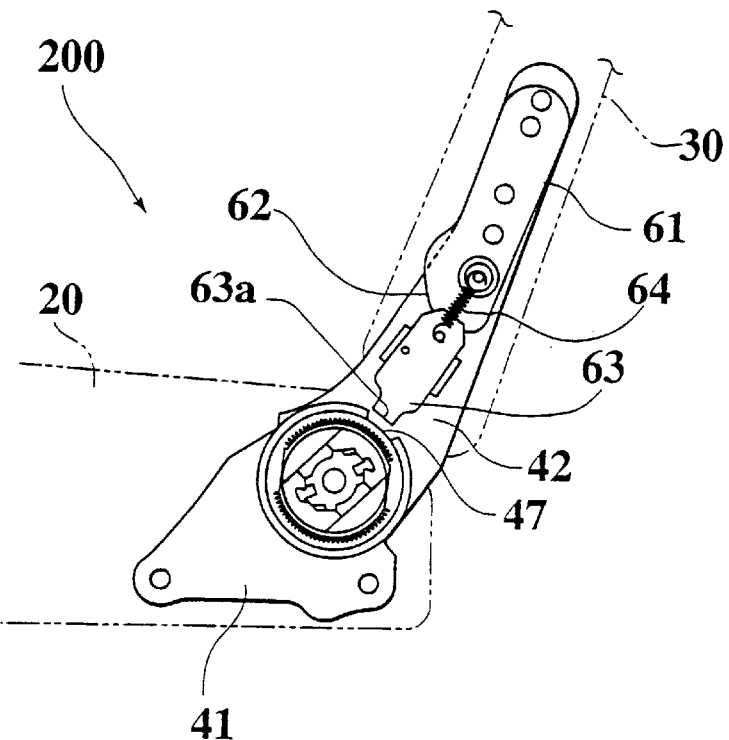
FIG. 16 is a side view of a seat for vehicle according to a third embodiment of the present invention.
Figure 17:
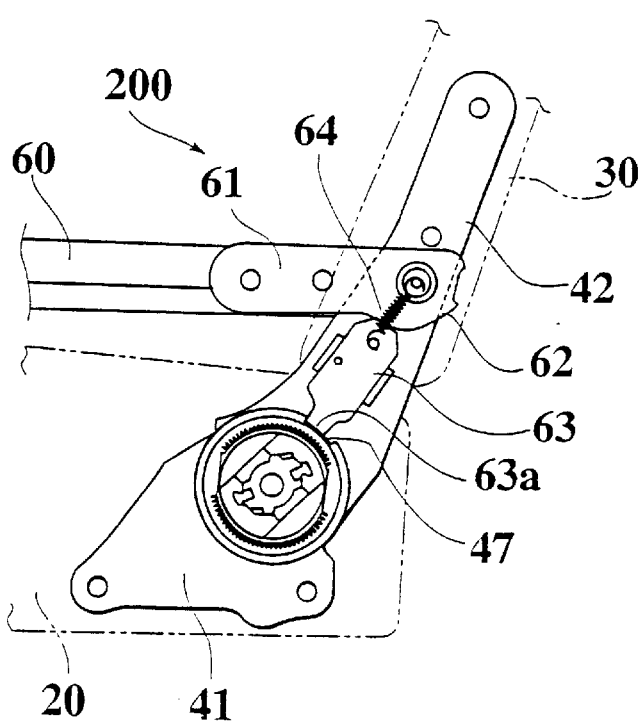
FIG. 17 is a side view of the seat for vehicle of the present invention when a child seat is being used.

FIGS. 16 and 17 show a third embodiment of the present invention, FIG. 16 being a side view of a storage state of the child seat, and FIG. 17, a side view when the child seat is being used.

In FIGS. 10 to 12, a seat for vehicle 100 comprises a seat back 30 for supporting the back of a passenger, which is attached by means of a reclining mechanism 40 and a center-folding mechanism 50 to a seat cushion 20 secured to the floor of the vehicle. The reclining mechanism 40 enables the seat back 30 to be adjusted to a predetermined reclining angle with respect to the seat cushion 20. In addition, the center-folding mechanism 50 enables the seat back 30 to be folded over the upper face of the seat cushion 20 so that the back face 31 of the seat back 30 can be used as a table, or alternatively, luggage space for storing a considerable amount of luggage can be provided. And, a child seat 60 is provided within the seat back 30 of the seat for vehicle 100. It is an object of the present invention to improve seat protection and safety for the passenger sitting in the child seat.

Firstly, the reclining mechanism 40 of the seat for vehicle 100 is principally comprises a base member 41, secured to the seat cushion 20, a rotating arm 42, which is rotatably supported by the base member 41, and an arm plate 51 of the center-folding mechanism 50, which is rotatably supported by the rotating end side of the rotating arm 42. This arm plate 51 is secured to both sides of the seat back frame of the seat back 30.

Therefore, the rotating arm 42 can be rotated to a predetermined tilt angle with respect to the base member 41 by operating the reclining mechanism 40. Moreover, it is possible to lock the rotating arm 42 at a predetermined lock position, thereby enabling the seat back 30 to be locked at a predetermined reclining angle with respect Lo the seat cushion Since the reclining mechanism 40 is not a primary element of the present invention, detailed description will be omitted here. Briefly, based on the diagrams, a toothed inner 43, provided between the base member 41 and the rotating arm 42, is controlled by a cam 44, rotated by an operation lever not shown in the diagram. In the locked state, a predetermined lock position is maintained by the meshing action of the inner teeth on the rotating arm 42 side with the toothed portion of the toothed inner 43. The reclining lock can be cancelled by rotating the cam 44, thereby cancelling the mesh between the toothed portions of the toothed inner 43 and the rotating arm 42, enabling the seat back 30 to be tilted.

Next, the center-folding mechanism 50 will be explained. The center-folding mechanism 50 comprises the arm plate 51, secured on both sides of the seat back frame of the seat back 30 and rotatably supported at the rotation fulcrum 51a on the rotating end side of the rotating arm 42, and a lock mechanism, for locking the arm plate 51 to the rotating arm 42, comprising a striker 45 which is provided on the rotating arm 42. Further, the arm plate 51 has a center-folding latch 52 which latches with the striker 45, the center-folding latch being provided to the arm plate 51 so as to rotate around a rotation fulcrum 52a. The mesh between the striker 45 and the center-folding latch 52 causes the arm plate 51 to become locked to the rotating arm 42.

And, a center-folding cam 53, provided in correspondence with the center-folding latch 52, rotates around a rotation fulcrum 53a. In addition, an operation lever 54 is provided on the opposite side of the rotation fulcrum 53a and a lock spring 55 is provided between the center-folding latch 52 and the center-folding cam 53. Therefore, the connection between the center-folding latch 52 and the striker 45 can be cancelled by using the operation lever 54 to operate the center-folding latch 52 in cooperation with the center-folding cam 53, thereby cancelling the lock between the rotating arm 42 and the arm plate 51. As shown in FIG. 12, the rotation fulcrums 52a and 53a are supported by the arm plate 51 and a support plate portion 51a at the both ends of the rotation fulcrums 52a and 53a respectively.

Since it is an object of the seat for vehicle 100 of the present invention to increase safety of the child seat 60, characterised in the configuration of an interlocking mechanism. In other words, as shown in FIGS. 11 and 12, a bracket 61 for fitting the child seat 60 is supported on the rotating end side of the rotating arm 42, so as to be capable of rotating around the same point as the rotation fulcrum 51a of the arm plate 51. An interlocking cam A62 as a first interlocking cam is provided on the lower end side of this bracket 61. And, the rotating arm 42 has a plate-shaped interlocking cam B63 as a second interlocking cam which contacts directly with the interlocking cam A62.

The interlocking cam B63 is spring-loaded in the direction contacting directly with the interlocking cam A62, by means of a spring for cancelling 64. And, along the cam face of the interlocking cam A62, the interlocking cam B63 advances and retreats to the base member 41 side. The rotating arm 42 further comprises a guide wall 46 in order to guide the interlocking cam B63. Further, as shown in FIGS. 14 and 15, a protrusion for cancelling center-folding 56 is provided at a predetermined point on the interlocking cam B63.

A cut-away portion 47, provided at a predetermined point in the rim of the base member 41 of the reclining mechanism 40, meshes with an engaging portion 63a on the tip of the interlocking cam B63, thereby locking the interlocking mechanism.

The seat for vehicle 100 of the present invention comprises the reclining mechanism 40, the center-folding mechanism 50 and the interlocking mechanism (comprising interlocking cam A62 and interlocking cam B63). The state of the child seat 60 during use will be explained in the followings.

In order to extract the child seat 60 to the position depicted in FIG. 13, the fitting bracket 61 for fitting the child seat 60 is rotated forward. A problem at this moment is the tilt angle of the rotating arm 42 with respect to the base member 41. In other words, when the child seat 60 is in an inappropriate position, the engaging portion 63a on the tip of the interlocking cam B63 of the rotating arm 42 is directly contacting the rim of the base member 41. At this moment, the interlocking cam A62 cannot operate in cooperation with the interlocking cam B63. As a result, it is not possible to rotate the fitting bracket 61 for fitting the child seat 60.

Therefore, as shown in FIG. 11, in order to pull out the child seat 60, the reclining mechanism 40 must first be operated so as to adjust the seat back 30 to a predetermined reclining angle at which the engaging portion 63a of the interlocking cam B63 is opposed to the cut-away portion 47 of the base member 41. Then, the plate-shaped fitting bracket 61 is rotated counter-clockwise (as shown in the diagram) as a result of the cooperation between the interlocking cam A62 and the interlocking cam B63, whereby the child seat 60 can be pulled out.

Thus, according to the present invention, the fitting bracket 61 can only be rotated when the seat back 30 is at an appropriate reclining angle. This has an advantage that the child seat 60 can always be provided in a safe and suitable position.

As shown in FIG. 13, when the child seat 60 has been pulled out and positioned, the engaging portion 63a of the interlocking cam B63 is clipped inside the cut-away portion 47 of the base member 41. However, a slight clearance is allowed for by the fact that the cut-away portion 47 is wider than the engaging portion 63a. Thus, the reclining motion of the reclining mechanism 40 can be effected in the range corresponding to this clearance.

However, even in a case where the reclining mechanism 40 as been accidentally unlocked during use of the child seat 60, the seat back 30 will not collapse forward since the interlocking cam B63 and the base member 41 are locked together by the lock mechanism. Safety during use of the child seat 60 is thereby effectively secured.

The base member 41 and the rotating arm 42 are firmly locked by the meshing action of the outer teeth of the toothed inner 43 and the inner teeth of the rotating arm 42, and in addition, the lock is further strengthened by the interlocking mechanism. Therefore, the seat back 30 does not shake when a large load is applied thereon, keeping the seat back 30 stable in an appropriate position.

Furthermore, according to this embodiment of the present invention, the seat back 30 cannot be center-folded while the child seat 60 is in use. In other words, a protrusion for cancelling center-folding 56 is provided at a predetermined point on the interlocking cam B63. When the interlocking cam B63 has slid downwards and the interlocking mechanism is locked, the protrusion for cancelling center-folding 56 is positioned on and above the rotation path of the center-folding latch 52 in the center-folding mechanism 50, in such a manner that the protrusion projects from the rotating arm 42 through a slot formed in the rotating arm 42 toward the rotation path of the center-folding latch 52. The protrusion for cancelling center-folding 56 consequently functions as a stopper for preventing the seat back 30 from being center-folded while the child seat 60 is in use, increasing the safety of the child seat 60.

When center-folding the seat back 30 in order to use the back face 31 of the seat back 30 as a table, or alternatively, to create more space for holding large-size luggage, the fitting bracket 61 is retracted into the seat back 30 to cancel the lock mechanism. Thereafter, as shown in FIG. 14, the center-folding latch 52 is rotated counter-clockwise (as shown in the diagram) to a predetermined tilt angle with respect to the base member 41, so that the engaging portion 63a of the interlocking camB63 faces a second cut-away portion 47a. Then, when the operation lever 54 is lifted upwards in this state, the center-folding cam 53 presses against the center-folding latch 52, detaching the center-folding latch 52 from the striker 45 and consequently cancelling the lock between the arm plate 51 and the rotating arm 42.

In this state, when the arm plate 51 is rotated counter-clockwise (as shown in the diagram) around the rotation fulcrum 51a, the interlocking cam B63 is pressed downward along to the cam face of the interlocking cam A62, whereby the engaging portion 63a on the tip of the interlocking cam B63 meshes inside the second cut-away portion 47a of the base member 41. As a result, the arm plate 51 is allowed to rotate. When the arm plate 51 is rotated, the cooperative action of the interlocking cams A62 and B63 enables the arm plate 51 and the seat back 30 to be collapsed to the center-folded state. Here, as shown in FIG. 15, the fitting bracket 61 rotates together with the arm plate 51 and becomes center-folded.

Thus, in contrast to the conventional technique, in which the child seat 60 could be pulled out irrespective of the reclining angle of the seat back 30, according to the second embodiment of the present invention, the bracket 61 for fitting the child seat 60 is only able to rotate when the seat back 30 is at an appropriate reclining angle. Consequently, the child seat 60 can be used safely and comfortably, without the seat back 30 mistakenly being released from its reclining state or center-folded while the child seat 60 is being used. As a result, a high level of safety can be guaranteed.

Furthermore, a movable arm rest may be provided instead of the child seat 60, and in that case, the fitting bracket 61 has only to function as a support for the arm rest. Therefore, when a movable arm rest has been provided instead of the child seat 60, the arm rest can be pulled out only when the seat back 30 is at an appropriate reclining angle. In addition, the arm rest is protected from damage caused by the seat back 30 mistakenly being released from its reclining state or center-folded while the arm rest is being used.

The above explanation referred to a case where the present invention was applied to a seat for vehicle 100 comprising a reclining mechanism 40, a center-folding mechanism 50 and a child seat 60 contained within the seat back 30. However, the present invention can also be applied in an embodiment wherein the seat for vehicle 100 does not include the center-folding mechanism 50.

FIGS. 16 and 17 illustrate the seat for vehicle 200 according to this third embodiment, in which the rotating arm 42 is secured to both side frames of the seat back 30. When using the child seat 60, as in the embodiment described above, the cooperative action of the interlocking cam A62 and the interlocking cam B63 is required in order to rotate the fitting bracket 61. As shown in FIG. 16, the fitting bracket 61 is only able to rotate when the seat back 30 is at an appropriate reclining angle, in other words, when the engaging portion 63a on the tip of the interlocking cam B63 is opposed to the cut-away portion 47 of the base member 41.

Furthermore, as shown in FIG. 17, when child seat 60 has been pulled out by rotating the fitting bracket 61, the engaging portion 63a on the tip of the interlocking cam B63 enters the cut-away portion 47 of the base member 41. This interlocking mechanism strengthens the support of the rotating arm 42, thereby preventing the seat back 30 from accidentally collapsing forward when the child seat 60 is being used. This effect of ensuring that the child seat 60 can be safely used is the same as that achieved in the second embodiment.

While preferred embodiments of the present invention have been described using specific terms, such description is for illustrative purposes, and it is to be understood that changes and variations may be made without departing from the spirit or scope of the following claims.

What is claimed is:

1. A seat for vehicle, comprising:

a base member secured to a seat cushion;

a rotating arm rotatably supported by the base member through a reclining mechanism, the rotating arm being provided with a seat back; and a fitting bracket rotatably supported by the rotating arm, the fitting bracket being provided with a child seat which is to be contained within the seat back; wherein the fitting bracket comprises a first interlocking cam;

the rotating arm comprises a second interlocking cam which cooperates with the first interlocking cam;

the base member comprises a cut-away portion at a predetermined point, so that an engaging portion provided on a tip of the second interlocking cam is engaged into the cut-away portion only when the rotating arm is at a predetermined tilt angle, thereby locking the rotating arm at the predetermined tilt angle; and only when the child seat is contained within the seat back, the engaging portion of the second interlocking cam is disengaged from the cut-away portion, thereby allowing the rotating arm to be tilted at any tilt angle.

2. A seat for vehicle, comprising:

a base member secured to a seat cushion;

a rotating arm rotatably supported by the base member through a reclining mechanism;

a center-folding mechanism rotatably supported on a rotating side of the rotating arm;

an arm plate rotatably supported by the rotating arm, the arm plate being provided with a seat back;

a fitting bracket to be provided with a child seat, the fitting bracket rotatably supported by the rotating arm, wherein the child seat is contained within the seat back;

the seat back can be folded onto the seat cushion by the center-folding mechanism when the child seat is contained within the seat back;

the fitting bracket comprises a first interlocking cam;

the rotating arm comprises a second interlocking cam which cooperates with the first interlocking cam;

the base member comprises a cut-away portion at a predetermined point, so that an engaging portion provided on a tip of the second interlocking cam is engaged into the cut-away portion only when the rotating arm is at a predetermined tilt angle;

the fitting bracket is allowed to rotate only at the predetermined tilt angle of the rotating arm;

thereby activating an interlocking mechanism constituted by the first and second interlocking cams which cooperates with a rotation of the fitting bracket so as to lock the rotating arm to the base member.

3. The seat for vehicle according to claim 2, wherein the second interlocking cam is provided at a predetermined point with a protrusion cancelling the center-folding operation;

the center-folding mechanism is provided with a center-folding latch; and the protrusion is positioned in the motion path of the center-folding latch when the engaging portion on the tip of the second interlocking cam clips into the cutaway portion at the predetermined point in the base member, thereby locking the interlocking mechanism.

* * * * *